United States Patent [19]
Linville et al.

[11] Patent Number: 5,402,165
[45] Date of Patent: Mar. 28, 1995

[54] DUAL LIGHTING SYSTEM AND METHOD FOR A VIDEO LOGGING

[75] Inventors: Gregory Linville, Oxnard; Donald L. Baker, Ventura, both of Calif.

[73] Assignee: Westech Geophysical, Inc., Ventura, Calif.

[21] Appl. No.: 135,325

[22] Filed: Oct. 12, 1993

Related U.S. Application Data

[63] Continuation of Ser. No. 789,329, Nov. 8, 1993, abandoned.

[51] Int. Cl.⁶ .............................................. H04N 7/18
[52] U.S. Cl. ...................................................... 348/85
[58] Field of Search ................ 358/100, 93, 107, 108; 354/63; H04N 7/18; 340/854.9, 856.3; 175/40; 166/250; 348/82, 84, 85

[56] References Cited

U.S. PATENT DOCUMENTS

| | | | |
|---|---|---|---|
| 2,632,801 | 3/1953 | Donaldson | 178/6.6 |
| 2,849,530 | 8/1958 | Fleet | 178/7.2 |
| 2,912,495 | 11/1959 | Moon | 358/100 |
| 3,199,613 | 8/1965 | Malott | 358/100 |
| 3,885,091 | 5/1975 | Fish et al. | 178/6 |
| 3,943,410 | 3/1976 | Kalberer, Jr. et al. | 317/31 |
| 4,229,762 | 10/1980 | Healy | 358/100 |
| 4,331,975 | 5/1982 | Krawza | 358/100 |
| 4,424,531 | 1/1984 | Elter et al. | 358/100 |
| 4,532,545 | 7/1985 | Hanson | 358/100 |
| 4,607,925 | 8/1986 | Kamigaichi et al. | 354/63 |
| 4,855,820 | 8/1989 | Barbour | 358/100 |
| 4,857,261 | 8/1989 | Marshall | 358/100 |
| 4,899,277 | 2/1990 | Iizuka et al. | 364/422 |
| 4,938,060 | 7/1990 | Sizer et al. | 73/151 |
| 5,140,319 | 8/1992 | Riordan | 358/100 |

FOREIGN PATENT DOCUMENTS

| | | | | |
|---|---|---|---|---|
| 2253115 | 8/1992 | United Kingdom | .......... | H04N 7/18 |

Primary Examiner—Tommy P. Chin
Assistant Examiner—Bryan S. Tung
Attorney, Agent, or Firm—Fulwider, Patton, Lee & Utecht

[57] ABSTRACT

A lighting system for a logging instrument probe for inspecting a passageway having different diameters. The lighting system has a light assembly of a plurality of light sources arranged in tandem. The light assembly is mounted under the sensor to selectively illuminate that part of the passageway lying within the sensor's field of view. Three extension legs are used to rigidly mount the light assembly forward of the sensor camera and at least one leg provides a conduit for the electrical wires used for powering the lights. The first light source is reverse facing. The length of the legs is selected to position a first light source at a particular distance away from the camera for inspection of the part of the passageway having the smaller size. A second light source is mounted in the light assembly and is forward facing. Connected between the first light source and the second light source is a spacer. The length of the body section of the spacer is selected to space the second light source from the camera by an amount which will provide a sufficient amount of light in the field of view of the camera for the larger part of the passageway.

15 Claims, 3 Drawing Sheets

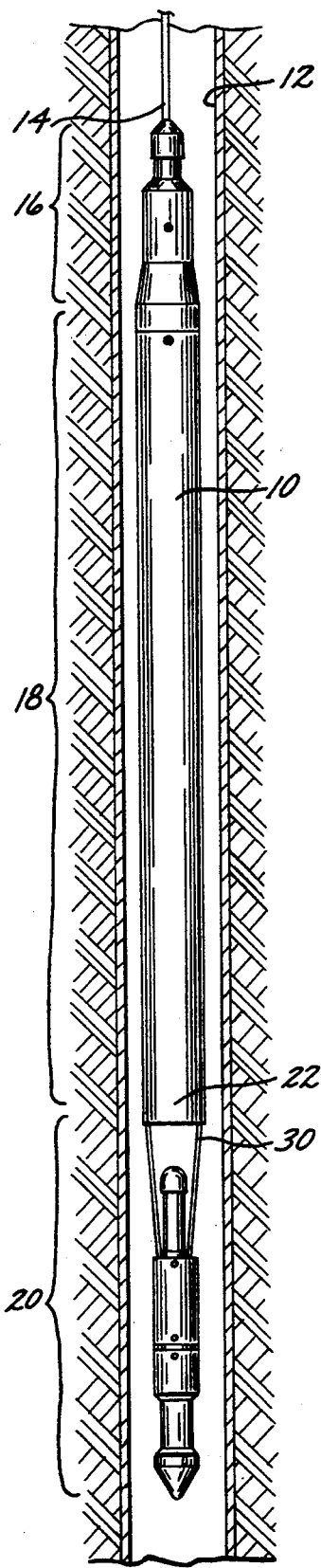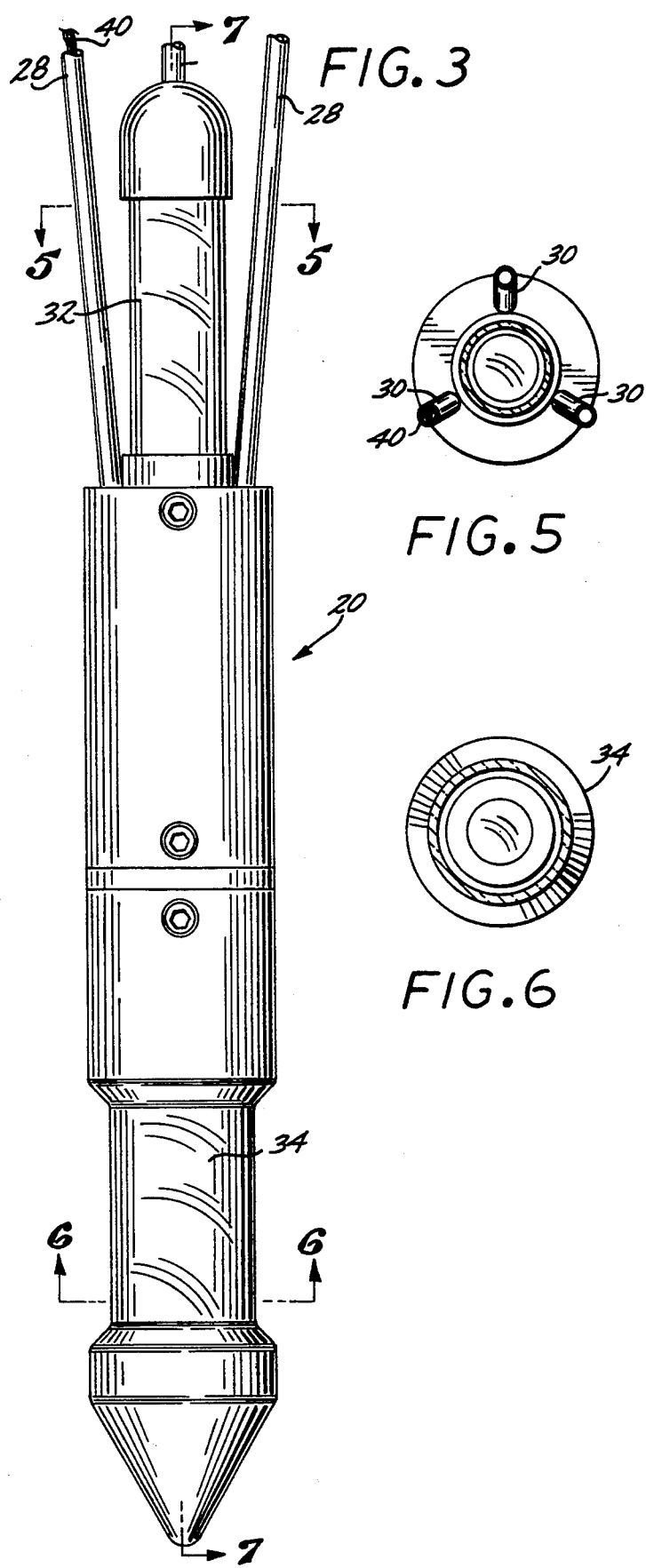

FIG. 2
FIG. 4A
FIG. 4B
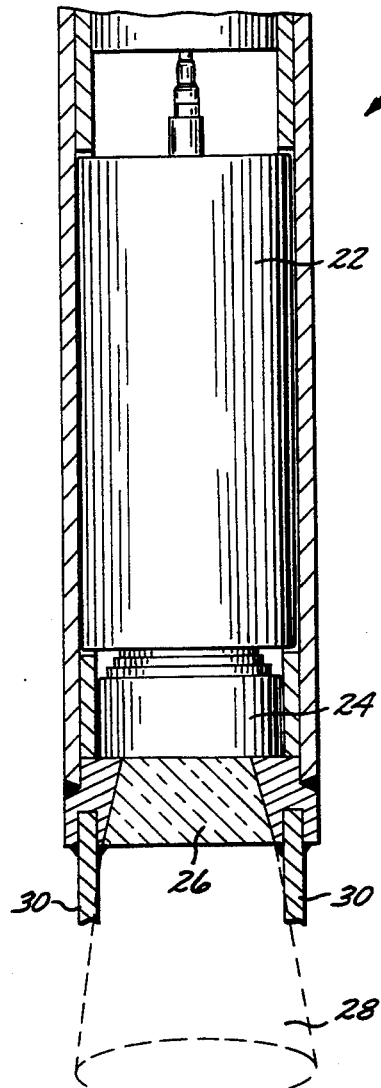
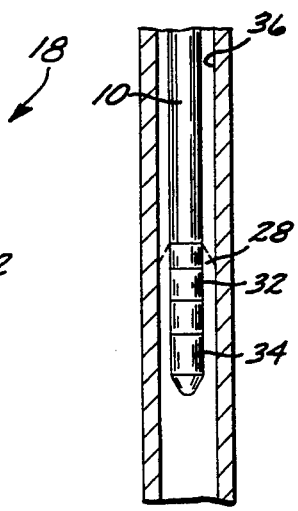
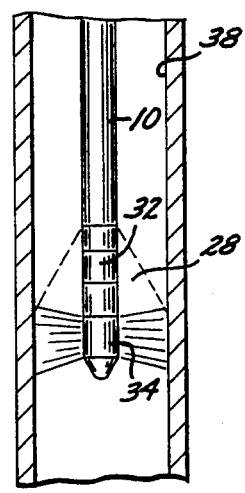
FIG. 12
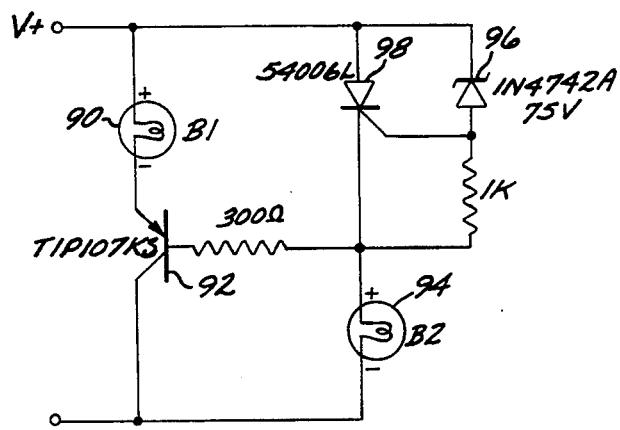

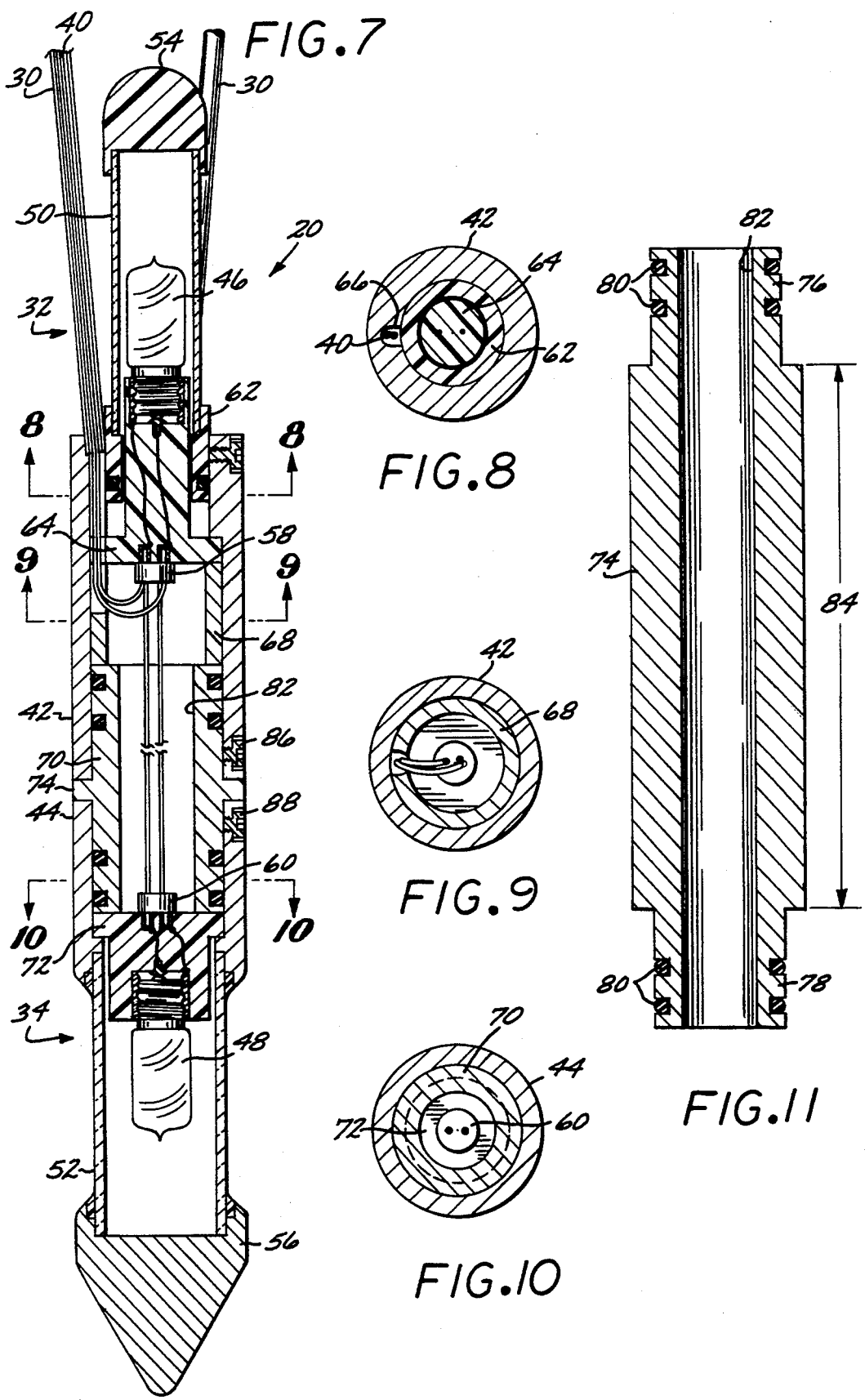

DUAL LIGHTING SYSTEM AND METHOD FOR A VIDEO LOGGING

This is a continuation of application Ser. No. 07/789,329, filed on Nov. 8, 1993, now abandoned.

BACKGROUND

The invention is related generally to the remote viewing of passageways and other limited access areas, and more particularly, to an apparatus having a sensor and light source for remotely viewing the condition of such limited access areas.

There has long been a need in the field of well boring to visually examine the bore hole for geological formations and for other conditions. In the operation and periodic maintenance of wells, it is frequently necessary to obtain information about the construction and operating condition of production equipment located downhole. Where these well bores have pipes and fittings, there is a continuing need to inspect this equipment for corrosion or other degradation. For example, detection of the onset of corrosion damage to well pipes within a bore hole enables the application of anti-corrosive treatments to the well. Early treatment of corrosive well conditions can prevent the highly expensive and dangerous replacement of corrosion damaged well production components.

Other maintenance operations in a production well environment, such as the replacement of various flow control valves or the inspection for the location and condition of casing perforations, make it highly desirable for an operator located at the surface to obtain accurate, realtime information about downhole conditions. A visible indication or record made to show precisely the location of any surface irregularities can greatly aid in maintenance.

One method of accomplishing this is to insert an instrument probe containing a camera, such as a closed circuit television camera, in the bore hole and move it through the area to be inspected. A compact, rugged instrument containing the camera and a light source is provided as the instrument probe. A cable is attached between the instrument probe and a surface station to communicate camera signals from the instrument probe to the surface station.

Such a logging instrument probe for well holes must be rugged to withstand the sometimes harsh conditions encountered in typical operation. For example, hydrostatic well pressures in excess of $4.2 \times 10^6$ kilograms per square meter (6,000 pounds per square inch) and ambient well temperatures of 190° C. (375° F.) and above are not uncommon. Another common condition in bore holes is turbidity in the form of gases, mud, oil, and other fluids under high pressure. In many instrument probes, high intensity lighting such as that provided by quartz lamps or halogen lamps is provided to give bright light in the visible range for use with conventional television cameras.

In many cases, the size of the pipe in a well hole changes. For example, a length of pipe beginning at the surface may have a relatively small diameter but at some predetermined depth, the pipe's diameter may change or it may be connected to a pipe having a much larger diameter. Such a variable size passageway can cause a substantial inconvenience when using a logging instrument probe for inspection. In many cases, the light source of the instrument probe is located at a particular distance from the camera to accommodate a particular diameter of passageway. The distance between the camera and light source can be critical for a successful inspection, especially in conditions of turbidity.

The camera typically has a fixed field of view or angle of view and the size of the passageway determines the distance from the camera that the passageway is viewed. The light source must be of a type or configuration to illuminate the area of the passageway within the camera's view. Where the light source is positioned for illuminating one diameter passageway and the diameter of the passageway changes, the light source may not illuminate the section of the pipe which is now viewed by the camera. Due to turbidity and power source limits, the illumination of the subject matter is also limited. Even with very efficient electrical/light transducers, such as halogen bulbs, enough light may not be produced to cover all changes in passageway diameter.

In the case where the passageway under inspection includes sections of different diameter, the light source is usually positioned for inspection of one size of passageway and the inspection is then made. The instrument probe is then withdrawn from the well and the light source repositioned for inspection of the second size of passageway. Where a long passageway is to be inspected, a substantial amount of time can be involved in removing the probe from the well, repositioning the light source, and then reinserting the probe into the well. This can be a time consuming process and while the well is under inspection, it is usually unavailable for use. Thus, rapid inspection is desirable.

Hence, those skilled in the art have recognized that it would be desirable to provide an improved lighting system so that a well hole of different sizes can be inspected without having to remove the instrument probe to adjust the spacing of the light source from the camera for the particular diameter of the hole. Additionally, those concerned with instrument probes for use in viewing bore holes and casings have recognized the need for an improved light system which can be readily and easily assembled in the field after the size of the hole has been determined. Additionally, a light system which can be manufactured on
repeatable and economical bases would be desirable. The invention fulfills those needs.

SUMMARY OF THE INVENTION

Briefly and in general terms, the present invention provides a lighting system for a logging instrument probe having, in one aspect, means for providing first and second beams of illumination which illuminate different areas of the passageway to be inspected. In one type of instrument probe, a downward facing sensor, such as a video camera, is used to inspect the passageway. The sensor typically has a fixed field of view which may include a 360° angle. The means for providing the light beams may be mounted in front of the sensor to illuminate that part of the passageway lying within the sensor's field of view. Where the passageway to be inspected has different diameters, the means for providing the light beams is positioned to illuminate respectively different areas of the passageway.

In one embodiment, the means for providing the light beams comprises two light sources positioned in a tandem arrangement. One light source is positioned closer to the sensor than the second light source. For inspecting the part of the passageway having the smaller diameter, the first light source is energized. For inspecting the part of the passageway having the larger diameter, the second light source is energized.

In a disclosed embodiment, at least one extension leg is used to mount the light assembly forward of the camera and at least one leg provides a conduit for the electrical wires used for powering the lights. The lengths of the legs are selected to position the first light source at a particular distance away from the camera for inspection of the part of the passageway having the smaller size. In an aspect of the invention, the first light source is mounted in the light assembly such that it is reverse facing; i.e., it faces the camera. A second light source is mounted in the light assembly and is forward facing; i.e., it faces away from the camera.

In another aspect, connected between the first light source and the second light source in the assembly is a spacer. The length of the body section of the spacer is selected to space the second light source from the camera by an amount which will provide a sufficient amount of light in the field of view of the camera for the part of the passageway having a larger diameter.

By means of this light assembly arrangement, well bores having different diameter pipe may be inspected with a single insertion of the instrument probe. The length of the extension legs is set to provide illumination for the smaller diameter pipe and the length of the body section of the spacer is selected to position the second light source to provide sufficient illumination for the larger diameter pipe.

These and other objects and advantages of the invention will become apparent from the following more detailed description when taken in conjunction with the accompanying drawings of illustrative embodiments.

BRIEF DESCRIPTION OF THE DRAWINGS

FIG. 1 is a diagram of a well logging instrument probe having a tandem light assembly in accordance with the principles of the invention FIG 2 is a diagram of a portion of the camera head of FIG. 1;

FIG. 3 is a side view of the tandem light assembly shown in FIG. 1;

FIGS. 4a and 4b are diagrams of the light patterns and field of view of the tandem light system and camera of FIG. 1;

FIG. 5 is a cross-sectional view of the light assembly of FIG. 3 taken along lines 5—5;

FIG. 6 cross-sectional view of the light assembly of FIG. 3 taken along line 6—6;

FIG. 7 is a partially cut-away, side view of the tandem light assembly of FIG. 3 showing the mechanical and electrical connections in one embodiment;

FIG. 8 is a cross-sectional view of the light assembly of FIG. 7 taken along lines 8—8;

FIG. 9 is a cross-sectional view of the light assembly of FIG. 7 taken along lines 9—9;

FIG. 10 is a cross-sectional view of the light assembly of FIG. 7 taken along lines 10—10;

FIG. 11 is a cross-sectional side view of a spacer in accordance with the principles of the invention; and FIG. 12 is a schematic diagram of an electrical circuit usable to control the energization of the light sources of the light source assembly of FIG. 7.

DESCRIPTION OF THE PREFERRED EMBODIMENTS

In the following description, like reference numerals will be used to refer to like or corresponding elements in the different figures of the drawings. Referring now to the drawings with more particularity, in FIG. 1 there is shown a well logging instrument probe 10 which has been lowered into the pipe 12 of a well bore, and a support cable 14. In a typical arrangement, one end of the support cable 14 is wound on a dram (not shown) which supports the cable 14 and in combination with a winch, is used for raising and lowering the cable 14 and the instrument probe 10 out of and into the pipe 12. A surface controller (not shown) controls the operation of the winch and the probe 10 and receives and processes information provided by the probe 10. The surface controller may include a recorder, such as a video tape recorder, for recording the information provided by the probe 10, and display devices.

As shown in FIG. 1, the instrument probe 10 comprises a cable head 16, an instrument head 18 and a light head 20. The connector head 16 typically includes the mechanical, electrical and optical connections to the support cable 14 and includes seals to stop fluids from entering the instrument probe 10.

Referring now to FIG. 2, a partially cutaway view of part of the camera head 18 is shown. A camera 22 with a lens 24 are shown mounted such that they face downward into the well bore. A quartz plug 26 is mounted in front of the camera lens 24 in this embodiment and seals the camera head 18 from outside fluids. The camera lens 24 and quartz plug 26 combination results in a particular field of view 28. In this case, this field of view 28 is fixed. Referring to both FIGS. 1 and 2, extension legs 30 are mounted adjacent the quartz plug 26 from which is suspended the light head 20.

Referring now to FIG. 3, the light head 20 is shown in more detail. The light head 20 comprises a tandem arrangement of two light sources. The first light source 32 is reverse facing; i.e., it is mounted so that it faces the camera head 18. The second light source 34 is forward facing; i.e., it is mounted so that it faces away from the camera head 18. Because the light sources are spaced from the camera lens 24 by the length of the extension legs and further, because of the tandem arrangement of the light sources 32 and 34, each light source is spaced from the camera lens by a different distance. The two light sources 32 and 34 will thus illuminate different parts of the pipe 12. This effect is shown in more detail in FIGS. 4a and 4b.

In FIGS. 4a and 4b, the effect of light placement is diagrammatically shown. In FIG. 4a, a pipe 36 which has a relatively small diameter is under inspection by the instrument probe 10. As shown, the field of view 28 of the camera encounters the pipe at a close distance from the camera. In this case, the first light source 32 is energized to illuminate the pipe 36 in the field of view 28. The second light source 34 is farther from the camera and in this case, the portion of the pipe 36 which it would illuminate is blocked from the field of view 28 of the camera by the light head itself. Thus, the second light source 34 would be placed in a deenergized state.

In the application shown in FIG. 4b, a pipe 38 of larger diameter is under inspection by the instrument probe 10. In this case, the field of view 28 of the camera encounters the pipe at a farther distance from the camera than in FIG. 4a. In this case, the second light source 34 is energized to illuminate the pipe 38 in the field of view 28. The first light source 32 is closer to the camera and in this case, the portion of the pipe which it would illuminate is not within the field of view 28. Thus, the first light source 32 is deenergized.

Because of the fixed angle of view of the camera, different sizes of pipe will have different lighting requirements. The larger the diameter of pipe, the farther down the pipe the camera views and the farther must be the lighting source. A light system in accordance with the invention uses a plurality of light sources spaced at different distances from the camera. Thus, a camera with a fixed field of view and having a light arrangement in accordance with the invention may be used to inspect pipes of different diameters during a single insertion of the probe into the pipe.

Referring now to FIG. 5, three extension legs 30 are used to mount the light head 20 to the camera head 18. These legs 30 are spaced at 120° intervals from each other in this embodiment. Extension legs 30 of different lengths may be used depending upon the inner diameter of the pipe 12. The lengths of the extension legs 30 determine the position of the first light source which is used for the smaller diameter pipe.

As shown in FIGS. 3 and 5, one of the extension legs 30 contains the electrical wires 40 used to conduct power to the light sources. FIG. 6 is a cross-section view looking up at the second light source 34.

Referring now to FIG. 7, a partial cross-sectional view of the light head 20 is shown having a tandem arrangement of two light sources 32 and 34. Each light source 32 and 34 includes a base 42 and 44 and a light bulb 46 and 48, which in this embodiment is shown as a threaded halogen light bulb. Other sources of light may be used and it is not intended that the invention be limited to halogen light bulbs. Covering and sealing each light bulb 46 and 48 is a housing 50 and 52 which is formed of a transparent material such as glass, and which provides a lateral view of 360° around the bulb. Domes 54 and 56 are formed of an opaque material and concentrate the light laterally. The domes may be reflective on the inside and in the case of the dome 54 on the first light source 32, it blocks light from directly reaching the camera. In the case of the second light source 34, the dome 56 is also opaque and, because it is the first part of the instrument probe 10 to proceed down the hole, it is tapered.

The housings 50 and 52, bases 42 and 44 and domes 54 and 56 are interconnected such that they are sealed from the entry of fluids.

Also shown in FIG. 7 are the electrical connections for the two light sources 32 and 34. The electrical wires 40 proceed from the camera head 18 through one of the extension legs 30 into the base 42 of the first light source 32. A connector block 58 couples the wires 40 to electrical contacts in the first base 42. From the first connector block 58, wires are routed to a second connector block 60 in the base 44 of the second light source 34. The connector blocks 58 and 60 in this embodiment slide into contacts mounted in the base 42 and 44 of each light source 32 and 34 to thereby result in ease and speed in connecting light sources.

Referring now to FIG. 8, a cross-section of the first base 42 is shown. The base 42 includes a mounting sleeve 62 and a light mount 64. The electrical wires proceed through the light mount 64 to the bulb socket to provide energy to the bulb 46. The base 42 of the first light source 32 has a channel 66 through which the wires 40 proceed.

Referring to FIG. 9, a cross-section view of the base 42 is shown and includes a spacer sleeve 68 which has an opening for channeling the electrical wires 40.

Referring now to FIG. 10, a cross-section view of the second light source 34 is shown. Inside the base 44 is shown a portion of a spacer 70 and a light mount 72 for the second bulb and the connector 60.

Referring now to FIGS. 7 and 11, spacers 70 of two sizes are shown. In accordance with this feature of the invention, replaceable spacers 70 are provided for adjusting the distance of the second light source 34 from the camera. The spacer 70 is easily and readily replaceable in the field. In FIG. 11, a spacer 70 is shown which includes a body section 74 and two connecting ends 76 and 78 for sealingly connecting with the bases 42 and 44 of the light sources 32 and 34. Each connecting end 76 and 78 includes two seals 80 which in this case are formed of an elastomeric material such as rubber or a rubber compound. Each spacer 70 has a hole 82 formed axially through it which may contain the electrical conductors for the second light source as shown in FIG. 7.

The body section 74 has a length 84 which is selected to position the second light source at a predetermined distance from the camera. This predetermined distance is the distance required to cause the illumination from the second light source to strike the pipe under inspection at a position within the field of view of the camera, as described above and shown in FIG. 4b. The length 84 of the body section 74 in FIG. 11 greatly exceeds that of the body section 74 in FIG. 7. Thus, the second light source 34 will be located much farther from the camera when the spacer of FIG. 11 is used and is suitable for inspecting a larger diameter pipe.

In operation, an instrument probe in accordance with the principles of the invention may be easily configured. After the size of the smaller pipe or the size of the smaller passageway has been determined, extension legs 30 of the appropriate size are attached to the camera head. Extension legs 30 of the appropriate length are selected to cause the illumination from the first light source 32 to illuminate the pipe in the field of view of the camera. These legs may be selected in the field; however, in most cases, pipes are of a common size, such as a two inch diameter or a four inch diameter, and the legs may have been already attached to the camera head upon arriving in the field.

Once the diameter of the larger pipe in the well has been determined, a spacer 70 having a body section 84 of the appropriate length is selected. The connector 60 and wires for the second light source are placed in the hole 82 through the spacer 70 and one connecting end 76 is inserted into the base 42 of the first light source 32. Once in position, the set screw 86 (FIG. 7) is tightened to hold the spacer 70 in position. The second light source is then electrically connected and is inserted over the other connecting end 78 of the spacer 70 and is fixed in position by tightening the second set screw 88.

A set of spacers, each having a different body length 84 may be carried into the field. After arriving at the site and determining the size of the larger passageway, the correct one is chosen and is connected with the first light source as described above. It should be noted that a slide fit is not the only means of connecting the spacer to the light source bases, other means may be used. For example, the spacer may be threaded, or it may be temporarily welded in place.

Referring now to FIG. 12, an electrical schematic diagram is presented which enables the selective energization of the plurality of light sources. A first voltage, such as thirty volts, is applied across the V+ and the V− terminals. The first light source 90 will provide illumination because the transistor 92 will be turned on. The second light source 94 will have negligible brightness due to the low current through it. By increasing the voltage across the V+ and the V− terminals, the voltage on the zener diode 96 is increased. Upon reaching its breakdown voltage, e.g., seventy-five volts, the zener diode 96 will conduct and a signal will be provided to the gate of the SCR 98. The SCR 98 will then conduct and the second light source 94 will then illuminate and the first light source will be off. To turn off the second light source 94, the voltage across the V+ and V− terminals is reduced to zero or almost zero volts. By then raising the voltage once again to thirty volts, the first light source 90 will be turned on but the second light source 94 will be off.

The transistor 92 may be a TIP107KS manufactured by Texas Instruments. The SCR 98 may be a 54006L manufactured by Teccor, distributed by Digi-Key, 701 Brooks Avenue South, P.O.B. 677, Thief River Falls, Minn. 56701. The zener diode 96 may be a 1N4742A.

In another embodiment, both the first and second light sources may be simultaneously energized. Modification of the circuit of FIG. 12 to achieve this result will be apparent to one skilled in the art.

Control over the energization of the light sources is an important consideration because of the difficulty of providing power to the instrument probe. Where the instrument probe contains its own power source, conservation of power is crucial so that the inspection may be completed before exhaustion of the power source. Where the power source is contained at the surface and electrical conductors are used to bring power to the instrument probe, the amount which may be conducted is limited by the distance between the power source and the probe. Thus power control is important.

Thus, in accordance with the invention, a new and useful lighting system is provided which is capable of illuminating passageways having different diameters along their length. Although an application for inspecting pipes was discussed above, the invention is not so limited. Other types of passageways may be inspected by using a lighting system in accordance with the invention. Multiple light sources are used and are selectively energized in accordance with the size of the passageway to be viewed. Additionally, more than two light sources may be used in the light system. Additional spacers may be used to correctly position the light sources in relation to the camera. An easily replaceable spacer is usable in the field to quickly set the spacing between the two light sources. Although stated as a light source, other energy sources may be used, depending on the type of sensor used; e.g., infrared, acoustic.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. In an inspection system for inspecting an elongated passageway, the inspection system comprising a downhole instrument for placement in the passageway, the instrument having a distal end pointing in the downhole direction in the passageway and a proximal end attached to a support cable, the support cable connecting the downhole instrument to a surface station, the instrument comprising:

a sensor for inspecting the passageway and providing images of the sensed passageway, the sensor having a longitudinal axis and mounted to the distal end of the downhole instrument and configured to have a field of view emanating from the distal end of the downhole instrument in a downhole direction centered about the sensor's longitudinal axis, the field of view being substantially 360 degrees about the longitudinal axis;

a spacer having a longitudinal axis and first and second ends, the first end being closer to the sensor than the second end, the spacer being rigidly mounted to the distal end of the instrument such that the spacer is located within the field of view of the sensor;

a first light source mounted at the first end of the spacer and located within the field of view of the sensor, the first light source providing light at a 360 degrees angle about the sensor's longitudinal axis to illuminate a first portion of the sensor's field of view, the first portion being located between first and second distances from the sensor;

a second light source mounted at the second end of the spacer and located within the field of view of the sensor, the second light source providing light at a 360 degree angle about the sensor's longitudinal axis to illuminate a second portion of the sensor's field of view, the second portion being located between third and fourth distances from the sensor;

wherein the first and second light sources are mounted in a tandem relationship to each other with the light sources being mounted at opposite ends of the spacer such that the first light source is closer to the sensor than the second light source and the second illuminated portion of the sensor's field of view is farther from the sensor than the first illuminated portion of the sensor's field of view and the second portion does not completely overlap the first portion.

2. The instrument of claim 2 wherein the first and second light sources comprise light producing bulbs and the first light source is mounted at the spacer so that the bulb faces in an uphole direction and the second light source is mounted at the spacer so that the bulb faces in a downhole direction when the instrument is introduced into the passageway.

3. The instrument of claim 1 wherein the first and second light sources have longitudinal axes and the light sources are located so that their longitudinal axes are centered along the longitudinal axis of the sensor.

4. The instrument of claim 1 wherein:

the spacer comprises a body located between the first and second ends, the length of the body being selected to space the second light source from the sensor by an amount dependent upon the desired location of the second illuminated portion in the sensor's field of view.

5. The instrument of claim 5 wherein the spacer is adapted to be mounted to the instrument such that it is replaceable with a spacer having a different body length, whereby the position of the second illuminated portion of the sensor's field of view can be adjusted.

6. The inspection system of claim 5 wherein the first light source is mounted to the sensor by at least one leg, the length of which is selected to space the first light source from the sensor by the first distance.

7. An inspection system for inspecting an elongated passageway having a first size for a portion of the passageway and a second size for a different portion of the passageway, the second size being larger than the first size, the inspection system comprising:
- a sensor for inspecting the passageway, the sensor having a longitudinal axis and a field of view centered about the sensor's longitudinal axis;
- a first light source which provides light at a 360 degree angle about the sensor's longitudinal axis and is disposed at a position from the sensor so as to illuminate a portion of the passageway of the first size which is within the sensor's field of view, the first light source being located at a first distance from the sensor and within the field of view of the sensor;
- a second light source mounted in tandem with the first light source and which provides light at a 360 degree angle about the sensor's longitudinal axis and is disposed at a position from the sensor so as to illuminate a portion of the passageway of the second size which is within the sensor's field of view, the second light source being located at a second distance from the sensor and within the field of view of the sensor; and
- a spacer having first and second ends and being mounted such that it is located within the sensor's field of view with the first end being closer to the sensor than the second end and having the first light source mounted at its first end and the second light source mounted at its second end, the spacer having a body with a length selected to space the second light source from the sensor by an amount which will result in the illumination provided by the second light source falling upon the passageway of the second size within the field of view of the sensor;
- wherein the second light source is located farther away from the sensor than the first light source.

8. The inspection system of claim 7 further comprising a control means for selectively controlling the energization of the first and second light sources, the control means being located with the first and second light sources.

9. The inspection system of claim 8 wherein the selective energization control of the control means is for selectively energizing each light source separately or for energizing both light sources at the same time.

10. A method for inspecting a passageway with a sensor, the method comprising the steps of:
- inserting a sensor having a longitudinal axis and a field of view centered about the longitudinal axis into the passageway;
- mounting a spacer within the field of view of the sensor, the spacer having first and second ends with the second end being located farther away from the spacer than the first end;
- mounting a first light source to the first end of the spacer;
- illuminating at an angle of 360 degrees about the sensor's longitudinal axis with the first light source a first portion of the field of view of the sensor, the first portion being located at a first distance from the sensor;
- mounting a second light source to the second end of the spacer;
- illuminating at an angle of 360 degrees about the sensor's longitudinal axis with a second light source a second portion of the field of view of the sensor, the second portion being located at a second distance from the sensor, the second portion of the field of view being farther from the sensor than the first portion; and
- wherein both the first and second light sources are located in the field of view of the sensor and the first light source is closer to the sensor than the second light source.

11. The method of claim 10 further comprising the step of disposing the first and second light sources in a tandem relationship to each other.

12. The method of claim 10 wherein the step of mounting the spacer in the sensor's field of view comprises replaceably mounting the spacer in the sensor's field of view so that the spacer may be replaced with a second spacer having a different length whereby the second light source is mounted at a different location within the sensor's field of view.

13. The method of claim 10 further comprising the step of mounting the first light source from the sensor by at least one leg, the length of which is selected to space the first light source from the sensor by the first distance.

14. The method of claim 10 further comprising the step of selectively energizing the first and second light sources with a control means located with the first and second light sources.

15. The method of claim 14 wherein the step of selectively controlling comprises the step of selectively energizing each light source separately or energizing both light sources at the same time.

* * * * *

UNITED STATES PATENT AND TRADEMARK OFFICE
CERTIFICATE OF CORRECTION

PATENT NO. : 5,402,165

DATED : March 28, 1995

INVENTOR(S) : Gregory Linville and Donald L. Baker

It is certified that error appears in the above-identified patent and that said Letters Patent is hereby corrected as shown below:

Column 8, line 46 (claim 2), replace "claim 2"
      with --claim 1--; and

Column 8, line 64 (claim 5), replace "claim 5"
      with --claim 4--.

Column 3, line 51,
      between "FIG. 6" and "cross-sectional" insert --is a--.

Signed and Sealed this

Twenty-sixth Day of December, 1995

Attest:

BRUCE LEHMAN

Attesting Officer        Commissioner of Patents and Trademarks